United States Patent [19]
Rydelek et al.

[11] Patent Number: 5,710,946
[45] Date of Patent: Jan. 20, 1998

[54] WATER-RESISTANT CAMERA WITH OPTICAL WEDGE TO SHIFT IMAGE OF NON-ALIGNED FILM FRAME COUNTER

[75] Inventors: James G. Rydelek, Henrietta; Alan E. Lewis, Rochester, both of N.Y.

[73] Assignee: Eastman Kodak Company, Rochester, N.Y.

[21] Appl. No.: 781,275

[22] Filed: Jan. 10, 1997

[51] Int. Cl.$^6$ .................................................. G03B 29/00
[52] U.S. Cl. .......................... 396/25; 396/281; 359/438
[58] Field of Search .................................. 396/25, 28, 29, 396/281, 284; 359/438

[56] References Cited

U.S. PATENT DOCUMENTS

| | | | |
|---|---|---|---|
| 2,739,760 | 3/1956 | Stein et al. | 235/91 R |
| 3,041,917 | 7/1962 | Glatt | 359/438 |
| 3,186,376 | 6/1965 | Zapp et al. | 116/114 |
| 3,433,141 | 3/1969 | Stutgart et al. | 396/386 |
| 3,583,300 | 6/1971 | Johnson et al. | 396/384 |
| 3,887,791 | 6/1975 | Kitchens | 359/438 X |
| 4,714,333 | 12/1987 | Tamamura et al. | 396/29 |
| 5,285,894 | 2/1994 | Kamata et al. | 206/316.1 |

*Primary Examiner*—Howard B. Blankenship
*Attorney, Agent, or Firm*—Roger A. Fields

[57] ABSTRACT

A water-resistant camera comprising a frame counter having successive numbered portions for indicating the particular number of exposures remaining for picture-taking, and an optical magnifier for transmitting ambient light beams to the frame counter to form an enlarged image of any one of the numbered portions in order to facilitate viewing the one numbered portion, is characterized in that the optical magnifier is positioned out of optical alignment with at the one numbered portion, and includes an optical wedge that bends the light beams the optical magnifier transmits to the frame counter in order to make the enlarged image of the one numbered portion appear to be optically aligned with the optical magnifier.

5 Claims, 4 Drawing Sheets

WATER-RESISTANT CAMERA WITH OPTICAL WEDGE TO SHIFT IMAGE OF NON-ALIGNED FILM FRAME COUNTER

CROSS-REFERENCE TO A RELATED APPLICATION

Reference is made to commonly assigned copending application Ser. No. 08/781,636 entitled WATER-RESISTANT CAMERA and filed Jan. 10, 1997 in the name of James G. Rydelek.

The cross-referenced application is incorporated in this application.

FIELD OF THE INVENTION

The invention relates generally to the field of photography, and in particular to water-resistant cameras such as a one-time-use camera. More specifically, the invention relates to a water-resistant camera with an optical wedge to shift an image of a non-aligned film frame counter to make the image appear to be centered.

BACKGROUND OF THE INVENTION

Film and cameras that are all in one, commonly referred to as single-use or one-time-use cameras, have become well known. Typically, the one-time-use camera is a simple point-and-shoot type comprising a rigid plastic, inner, main body part which supports film cartridge in a cartridge receiving chamber, a film take-up spool in a film supply chamber, a fixed-focus taking lens, a film metering mechanism with a rotatably supported metering sprocket, a manual film advance thumbwheel rotatably engaged with a film spool inside the film cartridge, a single-blade shutter, a manually depressible shutter release button, a frame counter having a numbered portion for indicating the particular number of exposures remaining for picture-taking, a direct see-through viewfinder, and in some models a fixed electronic flash. A pair of substantially thin plastic front and rear cover parts house the main body part between them to complete the camera unit. The rear cover part connects to the main body part and/or to the front cover part to make the main body part light-tight. A decorative cardboard outer box or label at least partially contains the camera unit and may have respective openings for the taking lens, the shutter release button, the film advance thumbwheel, the viewfinder, the frame counter, and a flash emission window for the electronic flash.

To use the one-time-use camera, after the photographer takes a picture, he or she manually rotates the thumbwheel in a film winding direction to rotate the film spool inside the film cartridge, to wind an exposed section of the filmstrip into the film cartridge. The rewinding movement of the filmstrip the equivalent of slightly more than one frame width rotates the metering sprocket (in engagement with the filmstrip) to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and rewound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from the film cartridge is attached to the film take-up spool, the film cartridge and the film take-up spool are loaded into the cartridge receiving and film supply chambers, and an intermediate leader section which bridges the film take-up spool and the film cartridge is engaged with the metering sprocket. Then, the front and rear cover parts are connected to the main body part and/or to the front cover part to complete the camera unit. Then, an engageable end of the take-up spool which protrudes from the film supply chamber is rotated to factory prewind substantially the entire length of the unexposed filmstrip from the film cartridge onto the film take-up spool and to rotate the metering sprocket to increment the frame counter to its total-available frame number setting. Lastly, the outer box is placed on the camera unit.

More recently, underwater one-time-use cameras have been commercialized which generally comprise a substantially thin water-resistant transparent casing and a camera unit contained in the water-resistant casing. A problem that might occur with these simple inexpensive underwater cameras is that the frame counter on the main body part of the camera unit may not be completely optically aligned with a magnifying lens integrally formed with the transparent casing. See prior art U.S. Pat. No. 5,285,894, issued Feb. 15, 1994.

SUMMARY OF THE INVENTION

According to one aspect of the invention, a water-resistant camera comprising a frame counter having successive numbered portions for indicating the particular number of exposures remaining for picture-taking, and an optical element for transmitting ambient light beams to the frame counter to form an image of any one of the numbered portions in order to view the one numbered portion, is characterized in that:

the optical element is positioned out of optical alignment with the one numbered portion, and includes an optical wedge that bends the light beams the optical element transmits to the frame counter in order to make the image of the one numbered portion appear to be optically aligned with the optical element.

According to another aspect of the invention, a water-resistant casing for containing a camera provided with a frame counter having successive numbered portions for indicating the particular number of exposures remaining for picture-taking, comprising an optical magnifier for transmitting ambient light beams to the frame counter to form an enlarged image of any one of the numbered portions in order to facilitate viewing the one numbered portion when the casing contains the camera, is characterized in that:

the optical magnifier is positioned to be out of optical alignment with the one numbered portion when said casing contains the camera, and includes an optical wedge that bends the light beams the optical magnifier transmits to the frame counter in order to make the enlarged image of the one numbered portion appear to be optically aligned with the optical magnifier.

DETAILED DESCRIPTION OF THE INVENTION

The invention is disclosed as being embodied preferably in a water-resistant one-time-use camera. Because the features of a water-resistant one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
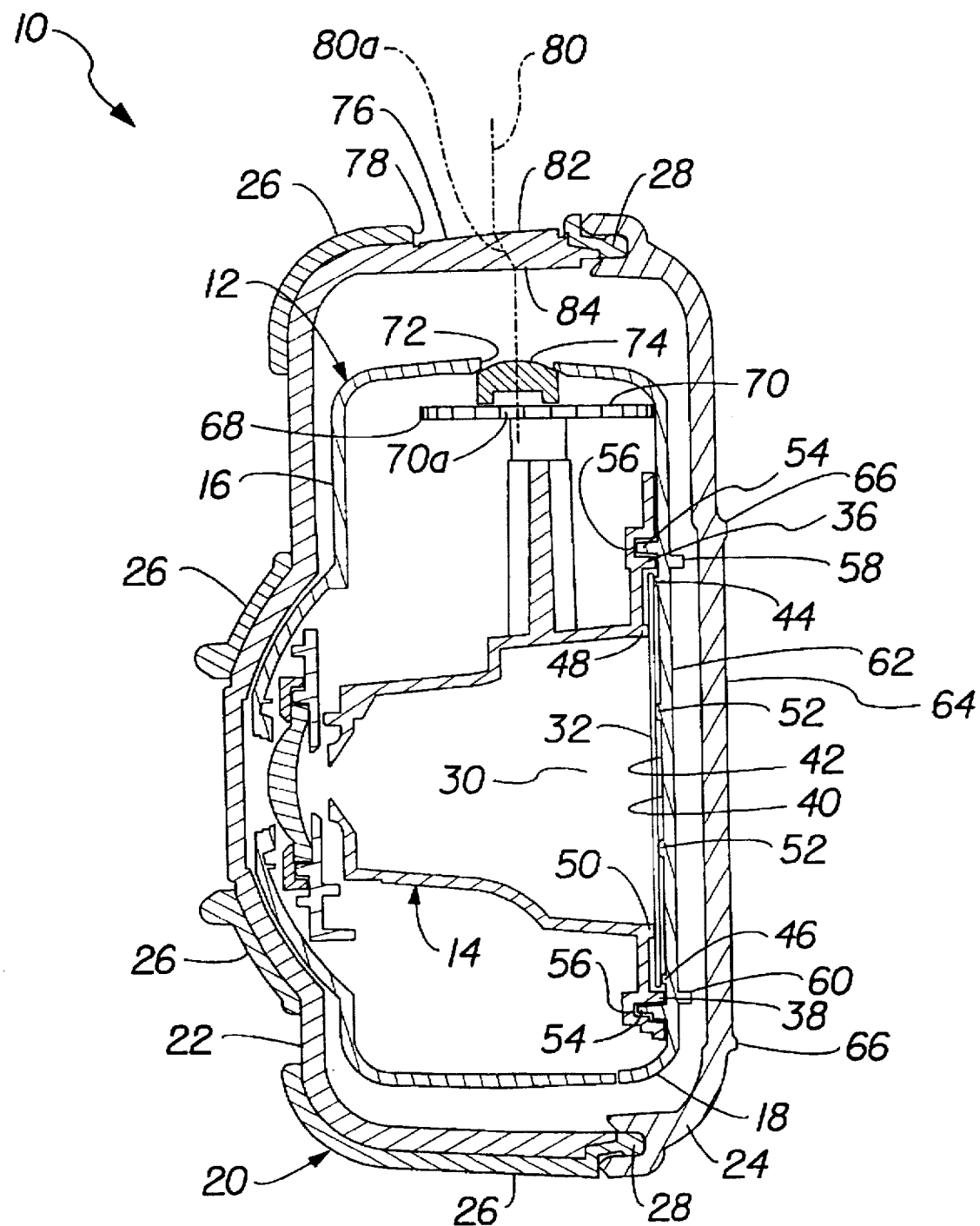
FIG. 1 is an elevation section view of a water-resistant camera, which is a preferred embodiment of the invention.

Referring now to the drawings, FIG. 1 shows a water-resistant one-time-use camera 10 comprising an opaque-plastic interior camera unit 12 having a rigid main body part 14 and a pair of substantially thin front and rear cover parts 16 and 18 which connect to one another to form a camera housing which houses the main body part in order to complete the camera unit, and an exterior water-resistant casing 20 having a pair of substantially thin transparent-plastic front and rear casing parts 22 and 24 which connect to one another to contain the camera unit and a rubber overlay 26 on the front casing part which includes an endless sealing bead 28 that fits between the front and rear casing parts.

Figure 4:
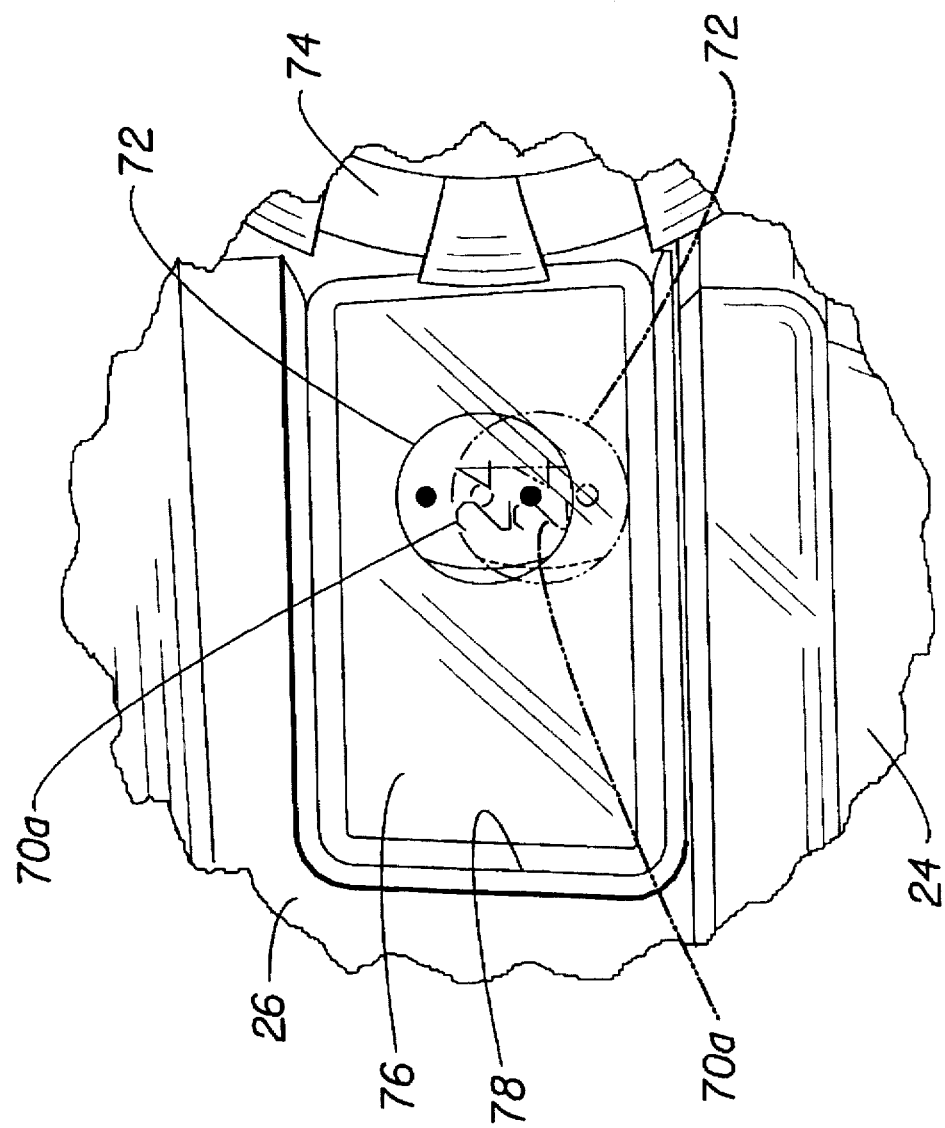
FIG. 4 is an enlargement of a portion of the camera as shown in FIG. 3.

The main body part 14 is adapted to be nested in the front cover part 16, and the rear cover part 18 is intended to be fitted to the main body part to make the main body part light-tight. See FIG. 1. The main body part 14 has integral cartridge-receiving and film roll chambers for a light-tight film cartridge and a film supply spool, not shown. The two chambers are located at opposite sides of a rear backframe or film exposure opening 30 at which successive sections of a filmstrip 32 are exposed during picture-taking. The successive film sections are moved from an unexposed film roll on the film supply spool, to the backframe opening 30 and, thence, into the cartridge by manually rotating an exterior thumbwheel 34 in winding engagement with a spool inside the cartridge. See FIG. 4.

As shown in FIG. 1, the main body part 14 has an integral pair of relatively short, rigid, upper spacer projections or pads 36 (only one shown) and a single, similar, lower spacer projection or pad 38, separate from but close to the backframe opening 30, which are slightly spaced from an inner side 40 of the rear cover part 18 to be able to abut the inner cover part side in order to maintain a film clearance space 42 between the backframe opening and the inner cover side for movement of successive sections of the filmstrip 32 across the backframe opening. The pair of upper spacer projections 36 and the single lower spacer projection 38 have respective right-angled sides that form parallel, longitudinal film edge guides 44 and 46 on the main body part 14. The two film edge guides 44 and 46 and the three spacer projections 36 and 38 border the film clearance space 42.

As shown in FIG. 1, the main body part 14 has a pair of curved film rails 48 and 50 between the backframe opening 30 and the three spacer projections 36 and 38 to support successive sections of the filmstrip 32 in a curved film plane at the film clearance space 50. The inner side 40 of the rear cover part 18 has a pair of parallel, curved film guide ribs 52 facing the backframe opening 30 to hold successive sections of the filmstrip 32 in the curved film plane at the film clearance space 42. The main body part 14 and the inner cover part side 42 have interlocking light-trapping ribs 54 and grooves 56 separate from the film clearance space 42.

The rear cover part 18 has a pair of parallel upper and lower support projections or ribs 58 and 60 on an outer side 62 of the rear cover part which face the rear water-resistant casing part 24 as shown in FIG. 1. The respective upper and lower support ribs 58 and 60 are aligned with the pair of upper spacer projections 36 and the single lower spacer projection 38. If the water-resistant camera 10 is underwater, a relatively strong ambient water pressure might tend to press or flex the rear water-resistant casing part 24 inwardly toward the rear cover part 18 to in turn depress the rear cover part into the film clearance space 42 to interfere with film movement. However, the upper and lower support ribs 58 and 60 will cooperate with the upper and lower spacer projections 38 and 38 to prevent the rear water-resistant casing part 24 from pushing the rear cover part 18 into the film clearance space 42 to interfere with film movement.

The rear water-resistant casing part 24 can be non-transparent except for a substantially flat central portion 64 which is transparent. The central portion 64 is spaced from the perimeter of the rear water-resistant casing part 24. A camera-identifying instruction label, not shown, is positioned directly between the central portion 64 and the rear cover part 18 to permit the label to be viewed through the central portion. The central portion 64 is parallel to the label, to provide a clear undistorted view of the label.

A continuous integral stiffener-rib 66 of the rear water-resistant casing part 24 intimately surrounds the central portion 64. See FIG. 1. The stiffener-rib 66 prevents the central portion 64 from being bent out of its flat plane, inwardly against the label and in turn the rear cover part 18, when the water-resistant camera 10 is underwater. Thus, the rear cover part 18 will not be pushed inwardly toward the film clearance space 42 because of the ambient water pressure. Since the stiffener-rib 66 is continuous, i.e. in a closed loop, it provides a multi-directional stiffness for the central portion 64. That is, a stiffness exerted at least along an x-axis and a y-axis. This is better than simply providing a unidirectional stiffness, i.e. one along only an x-axis or a y-axis.

Since the central portion 64 is prevented from being bent out of its flat plane because of the ambient water pressure, the central portion is maintained parallel to the label. This is important. If the central portion 64 were bent into a curve because of the ambient water pressure, the view of the label through the central portion might become distorted.

Figure 2:
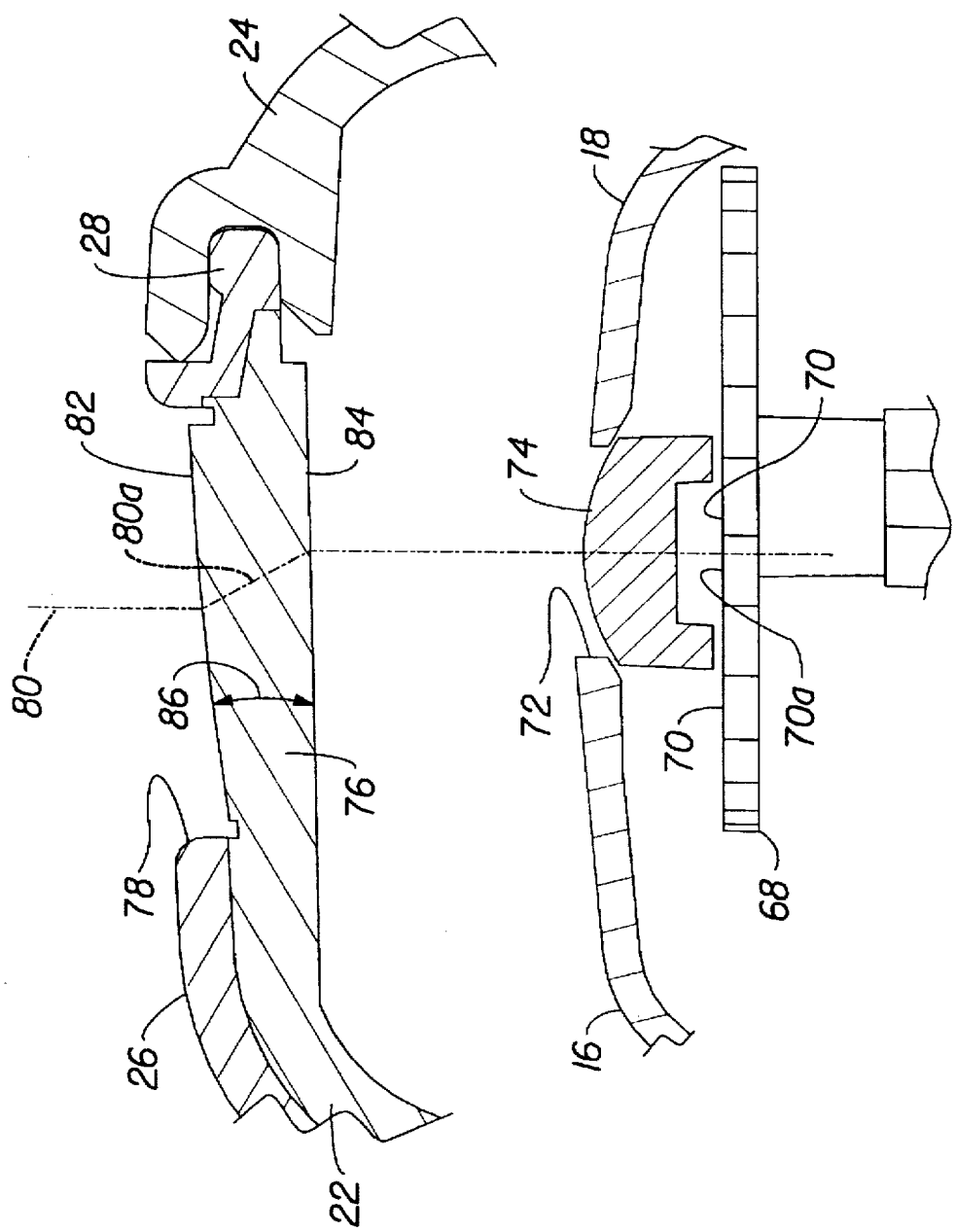
FIG. 2 is an enlargement of a portion of the camera as shown in FIG. 1.

As shown in FIGS. 1 and 2, the main body part 14 rotatably supports a known type film frame counter 68 having an annular series of successive numbered portions 70 for indicating the particular number of exposures remaining for picture-taking. Incremental rotation of the frame counter 68 advances the respective numbered portions 70 into and out of a cover window or opening 72 in the front and rear cover parts 16 and 18. A magnifying lens 74 in the cover window 72 transmits ambient light beams to the frame counter 68 to form an enlarged image of the one numbered portion 70a at the cover window in order to facilitate viewing the one numbered portion through the cover window.

Figure 3:
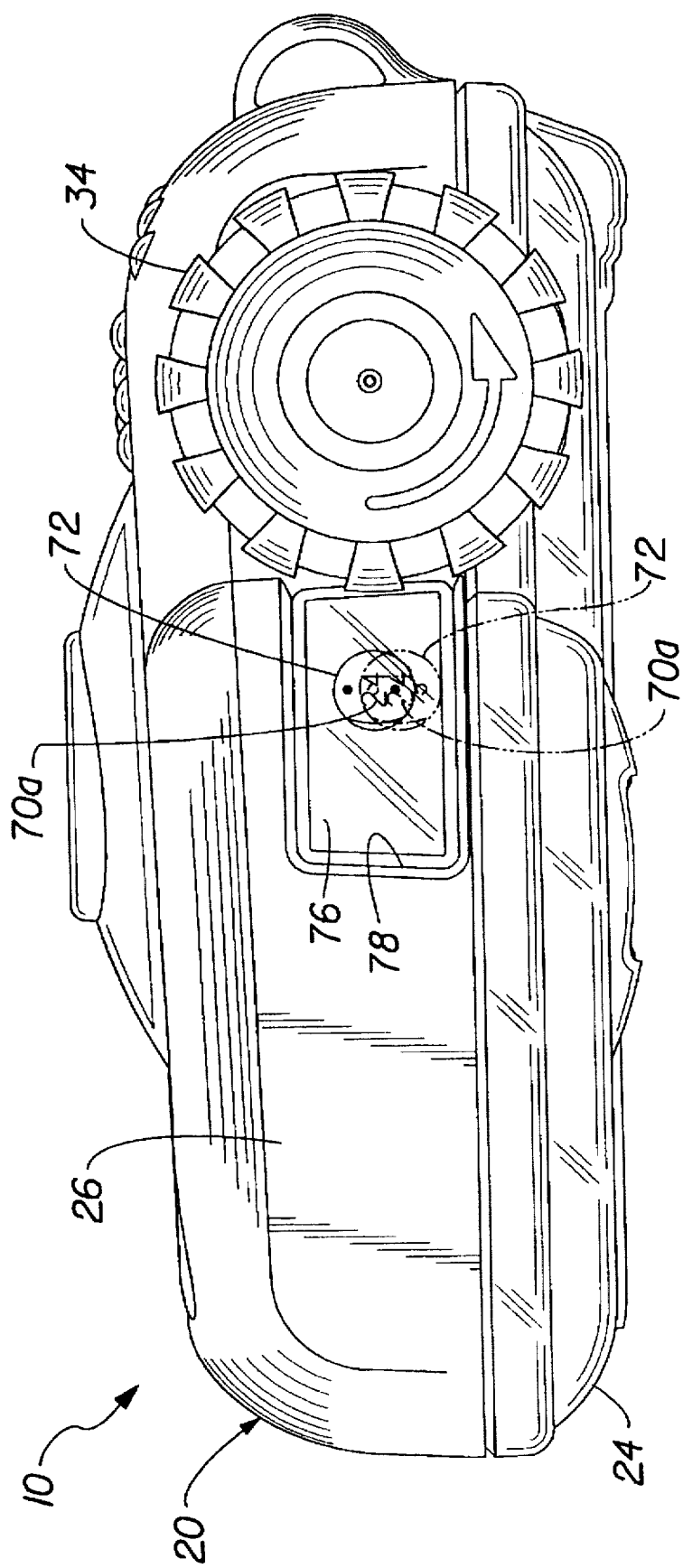
FIG. 3 is a top plan view of the camera.

The front casing part 22 has an integral optical magnifier wedge or prism 76 which, as shown in FIGS. 1 and 2, is positioned in a casing window or opening 78 in the rubber overlay 26 to be optically off-center with respect to the cover window 72 in the front and rear cover parts 16 and 18 and to be slightly out of optical alignment with the one numbered portion 70a at the cover window. This is illustrated by the broken line representation of the cover window 72 including the one numbered portion 70a in FIGS. 3 and 4, and the bend 80a in the optical axis 80 in FIGS. 1 and 2. The optical wedge 76 has a pair of planar, non-parallel, light-transmitting surfaces 82 and 84 at which ambient light beams are refracted before the magnifying lens 74 can transmit the light beams to the frame counter 68 to form an enlarged image of the one numbered portion 70a at the cover window 72, and it has an included angle 86 between the two light-transmitting surfaces that is less than 45°. See FIG. 2. Consequently, the optical wedge 76 bends the light beams the magnifying lens 74 transmits to the frame counter 68 in order to make the enlarged image of the one numbered portion 70a appear to be optically aligned, i.e. shifted or centered, with respect to the optical wedge. See the solid line representation of the cover window 72 including the one numbered portion 70a(as compared to their broken line representation) in FIGS. 3 and 4.

The invention has been described with reference to a preferred embodiment. However, it will be appreciated that variations and modifications can be effected by a person of ordinary skill in the art without departing from the scope of the invention. For example, the optical wedge 76 need not have a magnifying capability.

PARTS LIST 10. water-resistant camera
12. camera unit
14. main body part
16. front cover part
18. rear cover part
20. water-resistant casing
22. front casing part
24. rear casing part
26. rubber overlay
28. endless sealing band
30. backframe opening
32. filmstrip
34. thumbwheel
36. pair of upper spacer projections
38. lower spacer projection
40. inner cover side
42. film clearance space
44. longitudinal film edge guide
46. longitudinal film edge guide
48. curved film rail
50. curved film rail
52. pair of curved film guide ribs
54. light-trapping ribs
56. light-trapping grooves
58. support rib
60. support rib
62. outer side of 18
64. flat central portion of 24
66. stiffener-rib
68. frame counter
70. successive numbered portions
70a. one numbered portion
72. cover window
74. magnifying lens
76. optical magnifier wedge
78. casing window
80. optical axis
80a. bend
82. wedge surface
84. wedge surface
86. included angle

What is claimed is:

1. A water-resistant camera comprising a frame counter having successive numbered portions for indicating the particular number of exposures remaining for picture-taking, and an optical element for transmitting ambient light beams to said frame counter to form an image of any one of said numbered portions in order to view the one numbered portion, is characterized in that:

said optical element is positioned out of optical alignment with said one numbered portion, and includes an optical wedge that bends the light beams the optical element transmits to said frame counter in order to make the image of said one numbered portion appear to be optically aligned with the optical element.

2. A water-resistant camera comprising a frame counter having successive numbered portions for indicating the particular number of exposures remaining for picture-taking, and an optical magnifier for transmitting ambient light beams to said frame counter to form an enlarged image of any one of said numbered portions in order to facilitate viewing the one numbered portion, is characterized in that:

said optical magnifier is positioned out of optical alignment with said one numbered portion, and includes an optical wedge that bends the light beams the optical magnifier transmits to said frame counter in order to make the enlarged image of said one numbered portion appear to be optically aligned with the optical magnifier.

3. A water-resistant camera as recited in claim 2, wherein said optical wedge has two planar light-transmitting surfaces at which the light beams are refracted and an included angle between said transmitting surfaces that is less than 45°.

4. A water-resistant camera comprising a frame counter having successive numbered portions viewable through a window to indicate the particular number of exposures remaining for picture-taking, and an optical magnifier for transmitting ambient light beams to said frame counter to form an enlarged image of any one of said numbered portions in order to facilitate viewing the one numbered portion through said window, is characterized in that:

said optical magnifier is positioned optically off-center with respect to said window, and includes an optical wedge that bends the light beams the optical magnifier transmits to said frame counter in order to make the enlarged image of said one numbered portion appear to be optically centered with respect to the optical magnifier when viewed through said window.

5. A water-resistant casing for containing a camera provided with a frame counter having successive numbered portions for indicating the particular number of exposures remaining for picture-taking, comprising an optical magnifier for transmitting ambient light beams to the frame counter to form an enlarged image of any one of the numbered portions in order to facilitate viewing the one numbered portion when said casing contains the camera, is characterized in that:

said optical magnifier is positioned to be out of optical alignment with the one numbered portion when said casing contains the camera, and includes an optical wedge that bends the light beams the optical magnifier transmits to the frame counter in order to make the enlarged image of the one numbered portion appear to be optically aligned with the optical magnifier.

* * * * *